United States Patent
Hartrampf et al.

(10) Patent No.: US 9,389,102 B2
(45) Date of Patent: Jul. 12, 2016

(54) SELECTOR LEVER ARRANGEMENT FOR OPERATING A TRANSMISSION IN A MOTOR VEHICLE

(71) Applicant: ZF Friedrichshafen AG, Friedrichshafen (DE)

(72) Inventors: Ralf Hartrampf, Wagenfeld (DE); Andreas Giefer, Lemfoerde (DE); Ludger Rake, Steinfeld (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 35 days.

(21) Appl. No.: 14/395,333

(22) PCT Filed: Mar. 12, 2013

(86) PCT No.: PCT/EP2013/054938
§ 371 (c)(1),
(2) Date: Oct. 17, 2014

(87) PCT Pub. No.: WO2013/156210
PCT Pub. Date: Oct. 24, 2013

(65) Prior Publication Data
US 2015/0122981 A1   May 7, 2015

(30) Foreign Application Priority Data
Apr. 19, 2012 (DE) .................. 10 2012 206 417

(51) Int. Cl.
*G01D 5/34* (2006.01)
*G01D 5/347* (2006.01)
*F16H 59/10* (2006.01)

(52) U.S. Cl.
CPC .............. *G01D 5/3473* (2013.01); *F16H 59/10* (2013.01); *F16H 59/105* (2013.01); *G01D 5/341* (2013.01); *G01D 5/342* (2013.01); *G01D 5/34746* (2013.01)

(58) Field of Classification Search
CPC ...................................... F16H 59/105
USPC .................. 250/231.13–231.18; 345/161
See application file for complete search history.

(56) References Cited

U.S. PATENT DOCUMENTS

| | | | |
|---|---|---|---|
| 4,672,214 A | 6/1987 | Takahashi et al. | |
| 4,731,530 A | 3/1988 | Mikan | |

(Continued)

FOREIGN PATENT DOCUMENTS

| | | |
|---|---|---|
| DE | 40 38 998 C1 | 5/1992 |
| DE | 43 09 049 A1 | 9/1994 |
| DE | 43 32 748 A1 | 3/1995 |
| JP | 2007-118699 A | 5/2007 |

OTHER PUBLICATIONS

International Search Report issued May 2, 2013 in International Application No. PCT/EP2013/054938.

(Continued)

*Primary Examiner* — Thanh Luu
(74) *Attorney, Agent, or Firm* — Brinks Gilson & Lione

(57) ABSTRACT

A selector lever arrangement for operating a transmission in a motor vehicle with a mounting fixture, a selector lever which is mounted at the fixture in such a way that it can be moved into the designated selector lever positions and an optical detection device for the selector lever position, which includes a carrier, several optical sensors which are arranged on the carrier, an optical deflector, at least one self-luminous light source that is arranged on the carrier, by means of which light can be directed onto the sensors via the deflectors, and a coding element equipped with an optical coding that is arranged within the optical path, which can be shifted into the designated coding positions by means of moving the selector lever, whereby the coding element is intended to be allocated between the sensors and the deflector that is made in form of a light guiding element, which is arranged at the carrier.

19 Claims, 4 Drawing Sheets

(56) References Cited

Figure 1:
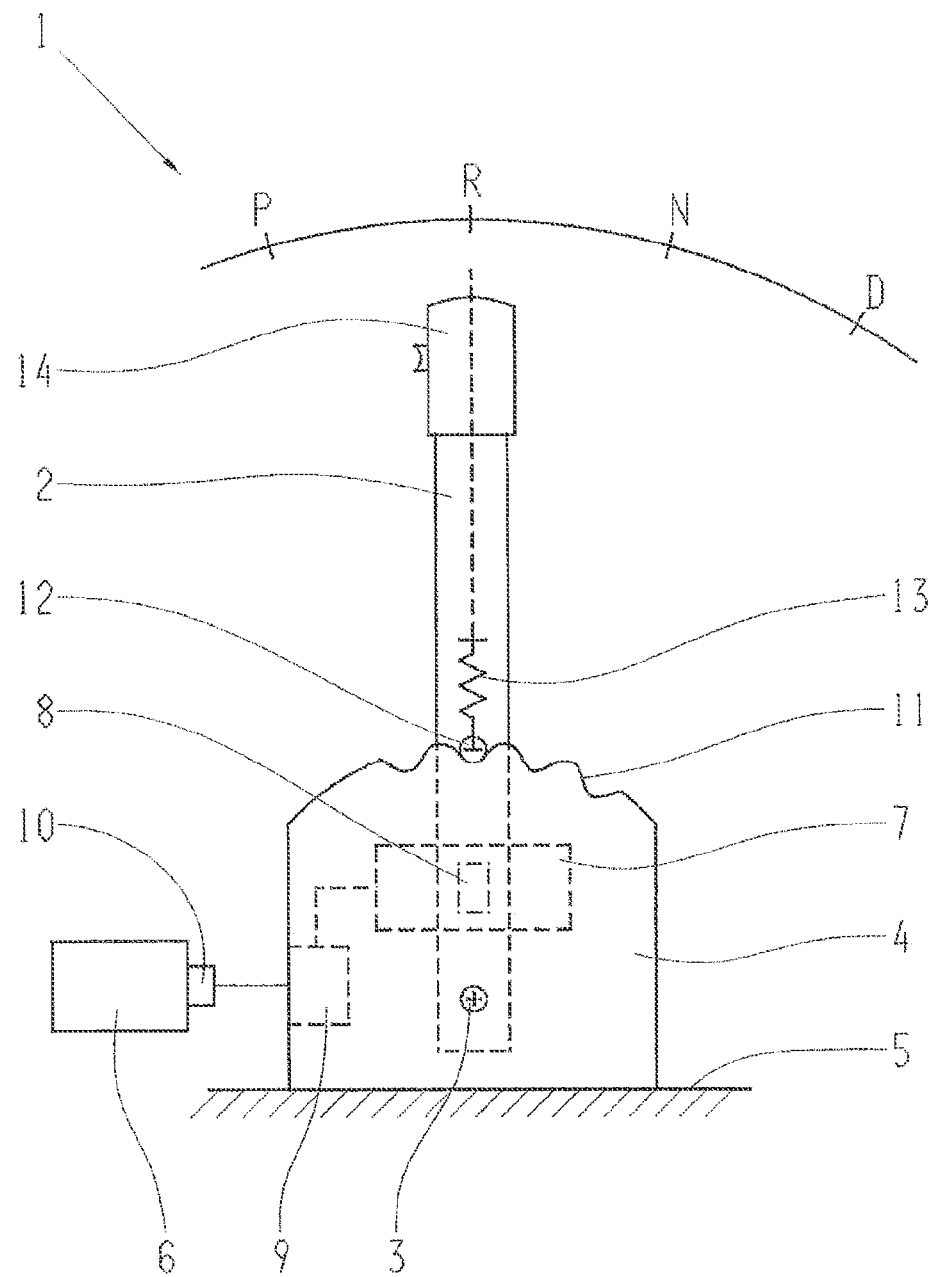

U.S. PATENT DOCUMENTS 5,729,007 A * 3/1998 Taniguchi ............. F16H 59/105
　　　　　　　　　　　　　　　　　　　　　250/231.13
2003/0193016 A1　10/2003　Chin et al.

OTHER PUBLICATIONS

International Search Report and Written Opinion issued May 2, 2013 in International Application No. PCT/EP2013/054938, German language.

* cited by examiner

SELECTOR LEVER ARRANGEMENT FOR OPERATING A TRANSMISSION IN A MOTOR VEHICLE

This application is a filing under 35 U.S.C. §371 of International Patent Application PCT/EP2013/054938, filed Mar. 12, 2013, and claims the priority of German Patent Application No. DE 10 2012 206 417.6, filed Apr. 19, 2012. These applications are incorporated by reference herein in their entirety.

The present invention relates to a selector lever arrangement for operating a transmission in a motor vehicle, with a mounting fixture, a selector lever which is mounted at the fixture in such a way that it can be moved into the designated selector lever positions and an optical detection device for the selector lever position, which includes a carrier, several optical sensors which are arranged on the carrier, an optical deflector, at least one self-luminous light source that is arranged on the carrier, by means of which light can be directed onto the sensors via the deflectors, and a coding element equipped with an optical coding that is arranged within the optical path, which can be shifted into the designated coding positions by means of moving the selector lever.

For the position detection of selector levers, magnetic position sensors are often used. The disadvantage of such sensors is, that only low resolutions can be achieved due to soft magnetic field transitions. Magnets are further made of rare earth elements, which get more and more expensive. Thus, there is a desire to replace magnetic position sensors with other sensors.

A selector lever arrangement of the previously mentioned kind uses optical position sensors and is known e.g. from DE 197 48 131 C2. The detection device for the selector lever of this selector lever arrangement features a mirror as deflector which is mounted to the fixture with a distance to the carrier. Thus, this detection device for the selector lever cannot be pre-assembled, since the mirror is mounted to the fixture with a distance to the carrier. It is thus not possible to test the detection device for the selector lever prior to the assembly of the selector lever arrangement. With reference to the optical path, the mirror and the carrier have to be arranged relative towards each other, so that there is a need for some adjustment for the mirror and/or the carrier during the assembly of the selector lever arrangement, which could be prevented or at least reduced by means of a pre-assembled detection device for the selector lever. In addition to this, the light is first coded, thereafter deflected and then directed towards the area sensor. The major part of the optical path is thus formed by means of the coded light signal. Yet, this can lead to an increased blurring of the position information that is carried on by the light, e.g. because the light beam is diverging.

Based on this fact, the invention has the objective to further develop the selector lever arrangement of the prior mentioned kind in such a way, that the distance between the coding element and the sensors can be kept to a minimum. Further, the assembly of the detection device for the selector lever should be kept simple. Preferably, it should be made possible that the detection device for the selector lever can be pre-assembled.

This objective is accomplished by means of a selector lever arrangement according to claim 1. Preferred further developments of the selector lever arrangement are presented in the sub-claims and in the following description.

The selector lever arrangement for operating a transmission in a motor vehicle includes a mounting fixture, a selector lever which is mounted at the fixture in such a way that it can be moved into the designated selector lever positions and an optical detection device for the selector lever position, which includes a carrier, several optical sensors which are arranged on the carrier, an optical deflector, at least one self-luminous light source that is arranged on the carrier, by means of which light can be directed to the sensors via the deflectors, and a coding element equipped with an optical coding that is arranged within the optical path, which can be shifted into the designated coding positions by means of moving the selector lever, whereby the coding element is intended to be allocated between the sensors and the deflector that is made in form of a light guiding element, which is arranged at the carrier.

Since the coding element is allocated between the deflector and the sensors, the path of the coded light of the overall optical path can be kept relatively short. Further, since the deflector is made in form of a light guiding element, the detection device for the selector lever can be assembled in a simple way. In particular the effort necessary for adjusting optical components can be reduced, since the course of the optical path can be basically set by means of the light guiding element. The aligning of the light source, deflector and sensors towards each other can thus be avoided or at least be reduced drastically. The light guiding element further allows for a particularly compact and stable embodiment of the detection device for the selector lever. The light guiding element for example provides both, a supporting frame and/or a part of the housing of the detection device for the selector lever at the same time. Finally, the deflector is intended to be on the carrier, so that the detection device for the selector lever can be pre-assembled.

The coding element can preferably be moved by means of the selector lever, in particular relative to the mounting fixture and/or to the carrier and/or to the sensors. The coding element can e.g. be operated by the selector lever with the insertion of a coupling element, which is preferably mechanically connected to the coding element as well as to the selector lever. According to an embodiment, the coding element is mounted onto the light guiding element in such a way that it is movable, in particular slidable, and advantageously slidable on a linear path. The embodiment can be constructed in a particularly compact, cost-effective and simple way.

According to a further development, the light guiding element includes one light output area and at least one light input area, through which the self-luminous light source feeds light into the light guiding element, which in turn deflects the inserted light and emits it through the light output area into the direction of the sensors and/or onto the coding element, which is allocated between the light output area and the sensors. The light output area is designed to be preferably plane or mainly plane. The light output area runs particularly parallel or mainly parallel to the carrier and/or to the coding element and/or to the sensors. In this way it is possible to achieve a compact embodiment of the optical detection device for the selector lever alongside an arrangement of the carrier via the sensors and the coding element towards the light output area of the light guiding element. In the sense of the present invention, a relative course of at least two surfaces/elements towards each other corresponds to a respective relative course of the planes which are comprised in these surfaces/elements.

The light input area can preferably be formed in a plane or curved way, e.g. convex. The light input area preferably runs parallel or mainly parallel to the light output area. In other words, the light guiding element preferably includes a least two different surfaces which face into the same direction, whereby the one surface forms a light input area and the other one of the two different surfaces forms the light output area. The sensors and the light source are hereby particularly arranged on the same side of the coding element, whereby the light input area is either located directly next to the light source or at some distance to it.

In one alternatively preferred further development to this, the light input area runs in an angle to the light output area. It is further preferred that the light guiding element is formed in such a way, that the light input area runs perpendicular to the light output area. It is further possible that the light input area is allocated directly next to the light source or at a distance to it. The light source can hereby be particularly arranged on the side of the light guiding element, whereby a part or the entire side surface of the light guiding element can form the light input area. Hereby, the sensors and at least an electric connection of the light sources are particularly arranged on the same side of the coding element.

Generally, the light source can be preferably allocated and/or arranged in such a way, that a light emitting area of the light source is fully covered by the light input area. The light emitting area of the light source and the light input area can preferably be of identical sizes, so that a light content, which is emitted from the light source, can fully enter into the light guiding element in consideration of a compact embodiment.

By means of the described arrangement of the sensors and of the light source or of the electric connection of the light source, it is possible to simplify the electric wiring of the detection device for the selector lever. In particular the carrier is designed in form of a conductor board. In this way, the sensors and the light source can be contacted via the conductor board. The sensors and the light source can hereby be allocated on a side of the coding element which is facing the carrier. Alternatively, the sensors can be allocated on the side of the coding element which is facing away from the carrier, whereby the carrier is transparent or has a permeable area for the light emitted from the light source at least in the area of the sensor arrangement. The carrier is designed preferably plane or mainly plane. Advantageously, the light guiding element conducts the light preferably on the side, around the coding element.

According to an embodiment, the light guiding element includes and/or limits an open inner space towards the carrier, into which the coding element is arranged. The inner space is in particular a hollow space. The inner space is preferably covered by the carrier, so that at least the light guiding element along with the carrier limit the inner space. In particular the light guiding element along with the carrier and/or the light sources form a basically closed box, into which inner space at least the coding element and further preferred, the sensors are arranged. Thus, a particularly compact construction of the detection device for the selector lever can be achieved. The box can e.g. be fully closed except for one or a few openings. The box preferably includes at least one opening, through which the coding element and/or the coupling element extend.

According to a further development, the coding element is movable relative to the sensors along one, or along at least one, straight line into the, or into several, coding positions. The coding element is e.g. movable in a straight line and/or within a plane. The coding element preferably includes one, two or three translational degrees of freedom. If the selector lever arrangement includes only one gear gate, the coding element can preferably be shifted along one straight line. In such a case the coding element includes e.g. exactly one or at least one translational degree of freedom. If the selector lever arrangement includes several gear gates, which are interconnected by means of a selector gate, the coding element can preferably be moved within a plane. In this case the coding element includes e.g. exactly two or at least two translational degree of freedom. This can be e.g. accomplished by means of a common slide-in-slide-gate system ("Schieber-in-Schieber-System"), whereby one slider enables the movement in one direction and the other slider a movement transverse to it.

The light guiding element is preferably made of plastic material. The light guiding element is particularly a cast part, preferably an injection molding component. Thus, it is possible to produce the light guiding element particularly cost-effective as a mass-produced article. It is further possible to design a bearing position for the coding element onto the light guiding element and/or to inject it onto the element and/or to form it as an integrated part. But it is also possible to produce the light guiding element out of glass or another light guiding material. It is further preferred that the light guiding element is made in such a way, that only the light input area or areas and the light output area or areas are translucent and that the other light guiding element surfaces are lightproof. In this way, the light rays of the light source, which enter through the at least one light input area can be directed within the light guiding element towards the light output area with a minimum reflection- or light intensity loss. In order to accomplish this, it is possible to form a respective reflective layer onto the remaining light guiding element surfaces e.g. by means of polishing or coating, which accomplish a guiding of the light rays emitted by the light source within the light guiding element in such a way, that the light rays, after entering through the light input area, can be reliably directed towards the light output area of the light guiding element. Neighboring to the remaining light guiding element surfaces, alternative or additional lightproof or light reflecting panels can be arranged onto components which are intended to be adjacent to the light guiding element or which directly rest against the remaining light guiding element surfaces, in order to cause the reflection of the light rays within the light guiding elements. It is also possible that one or more corner areas of the light guiding elements are chamfered or beveled, in order to guide light rays reliably within the light guiding element towards the light output area. Such a preferred further development is particularly advantageous in a certain embodiment of the light guiding element, in which the light input area and the light output area of the light guiding element face into almost the same or identical directions. In relation to the light input area, the chamfered or beveled corner area between the light input area and the light output area has to be preferably designed in such a way, that the light rays which enter via the light input area can be reliably guided into the direction of the light output area.

The self-luminous light source is, or includes preferably one, or at least one light emitting diode. The light is preferably infrared light. Thus, the self-luminous light source is advantageously an infrared light source. The self-luminous light source can preferably be controlled with a clock cycle. By means of this, the light rays, or the light, is not permanent, but is emitted by the self-luminous light source, or the light emitting diode, according the clock cycle. Such an effect can preferably be used for error diagnosis of at least one of the sensors, since at least one sensor sends out a status signal which corresponds to the clock cycle. In this particular way, a failure or defect of at least one sensor is detectable. By means of establishing the difference of different status signals, it can be determined if the sensor is activated or deactivated. By means of establishing the difference, the proportion of a dark current of the sensors can be taken into account. By means of the sensors it is further possible to perform an electric detection depending on the status of the self-luminous light source.

Preferably, the coding element can be moved relative to the sensors into the different coding position by means of moving the selector lever. The coding positions are particularly assigned to one of the respective selector lever positions. It is preferred that the intended coding in the different coding positions of the coding element is varying. The coding between two neighboring coding positions feature a hamming distance of two, three, four or at least four. Principally, hamming distances of two or three are possible, but due to the safety requirements that are stipulated for motor vehicles, the hamming distance is supposed to be four or at least four.

According to a further development, the optical coding includes one or more translucent areas and one or more lightproof areas. These areas in particular, can be brought into a position where they overlap with at least one of the sensors in at least one of the respective coding positions. These areas are advantageously areas of the coding element.

The coding element consists e.g. of a printed element, an element with a lasered surface or an etched element. In this way, resolutions of up to 100 µm are possible. The element is e.g. a foil, a plate or a panel. If the element is a foil, it is preferably attached to a carrier element, e.g. applied onto it or clamped into it or fully surrounded by it. The carrier element can e.g. be a plate, a panel or a frame. If the carrier element is a frame, it is possible that it can preferably fully enclose the foil, e.g. by means of injection molding, by means of which the foil can be reliably protected against foreign objects and other influences. For this reason, the carrier body is preferably made out of an injection moldable plastic material. In view of other possible embodiments, the elements and/or the carrier elements can preferably be made of glass, plastic or metal. The element and/or the carrier element preferably includes a translucent material. In such a case, particularly the one or all of the lightproof areas are formed at, onto or into the element. Alternatively, the element and/or the carrier element includes e.g. a lightproof material. In such a case, particularly the one or all of the translucent areas are formed at or into the element or the carrier element. The lightproof areas can be produced by means of e.g. printing on the element with a lightproof color. It is further possible to achieve the translucent areas by means of etching or chipping away portions in the lightproof element. The coding element is preferably plane and further preferred mainly plane, in consideration of the manufacturing tolerances. In the sense of the present invention, the definition "mainly" still includes such modified preferred embodiments, which include slight modifications or changes, in other words a tolerable impact compared to an embodiment without such a specific definition. It may for example be possible, that the mainly plane coding element has elevations and/or deepenings which go beyond the manufacturing tolerances, compared to a plane coding element with an embodiment that is preferably within the manufacturing tolerances, without influencing the functionality of the coding element, which would be a letting through of a predetermined necessary proportion of light rays for the detection of the position of the selector lever that is connected to the coding element According to a further development, the light guiding element includes several light input areas, whereby several self-luminous light sources are intended on the carrier, which feed light through the light input area into the light guiding element. This is especially practical, if the light output area is not sufficiently flooded with light due to the spatial dimensions and/or the geometry of the light guiding element. The light sources preferably emit light of the same wavelength.

It is preferred that the selector lever is connected to the coding element, preferably in a mechanical way. In particular, the coding element and the selector lever are connected in a way that they move together. It is preferred that the carrier is connected to the mounting fixture, preferably in a solid way, in particular an inflexible way. The selector lever e.g. is connected to the mounting fixture in such a way, that it can be shifted and pivoted. The selector lever can particularly be moved into the different gear positions along one or along at least one gear gate. If more than one gear gate is intended, then these are connected by means of a selector gate.

According to an embodiment, the sensors are electrically connected to an evaluation device. The or a transmission of a motor vehicle can be preferably controlled by means of the evaluation device. The evaluation device is particularly connected to the transmission of the motor vehicle.

Figure 2:
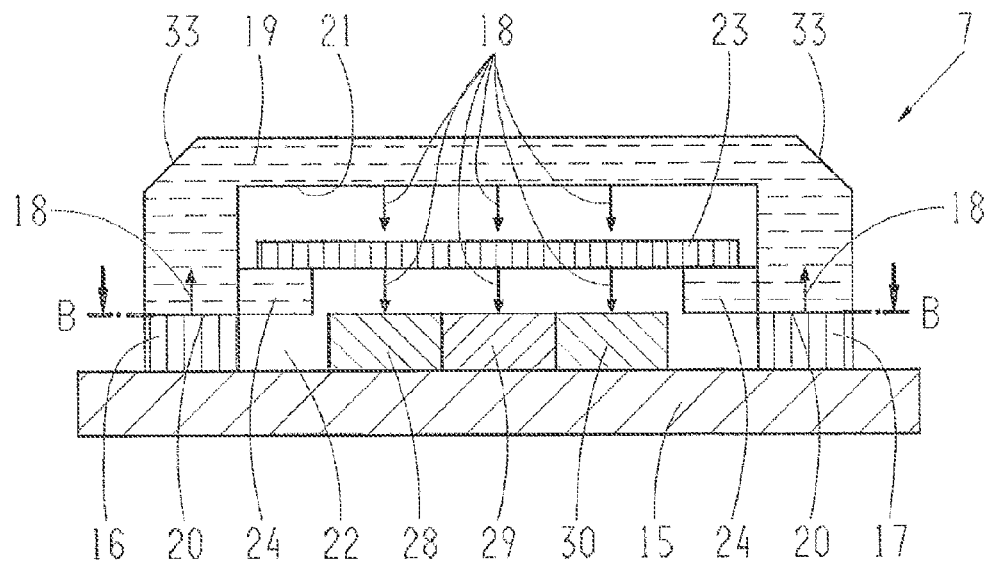

In the following, the invention is described with the help of a preferred embodiment, with reference to drawings. The drawings depict:

FIG. 1 a schematic view of a selector lever arrangement according to an embodiment, FIG. 2 a sectional view of the detection device of the selector lever position, which can be seen in FIG. 1

Figure 3:
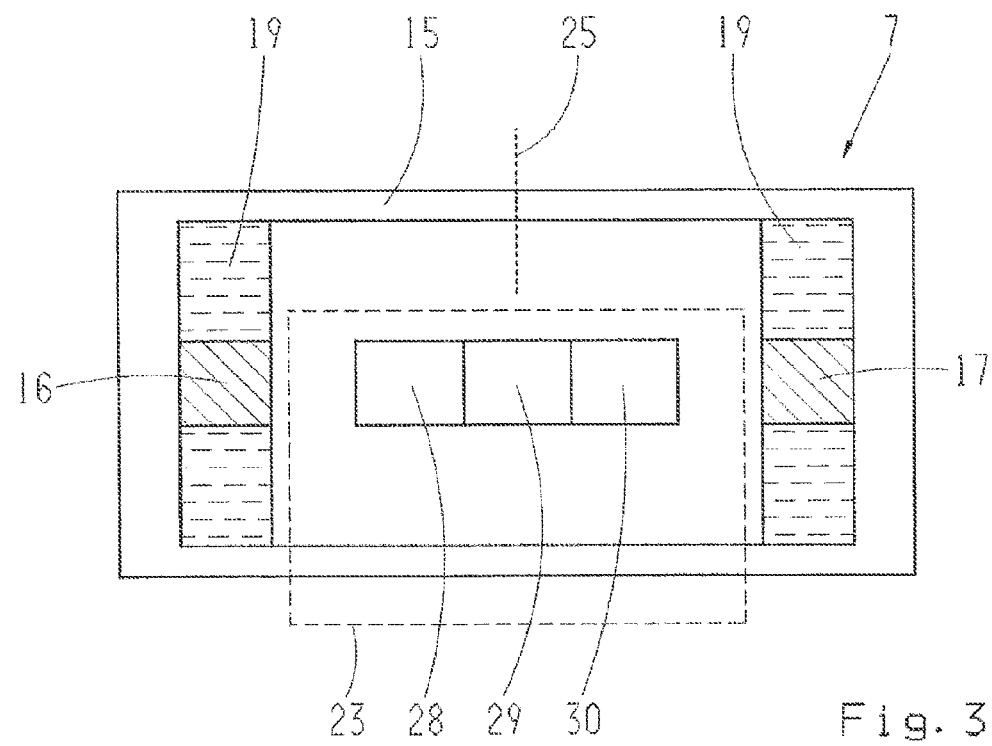

FIG. 3 a sectional view of the detection device of the selector lever position along the intersecting line B-B as it can be seen in FIG. 2

Figure 4:
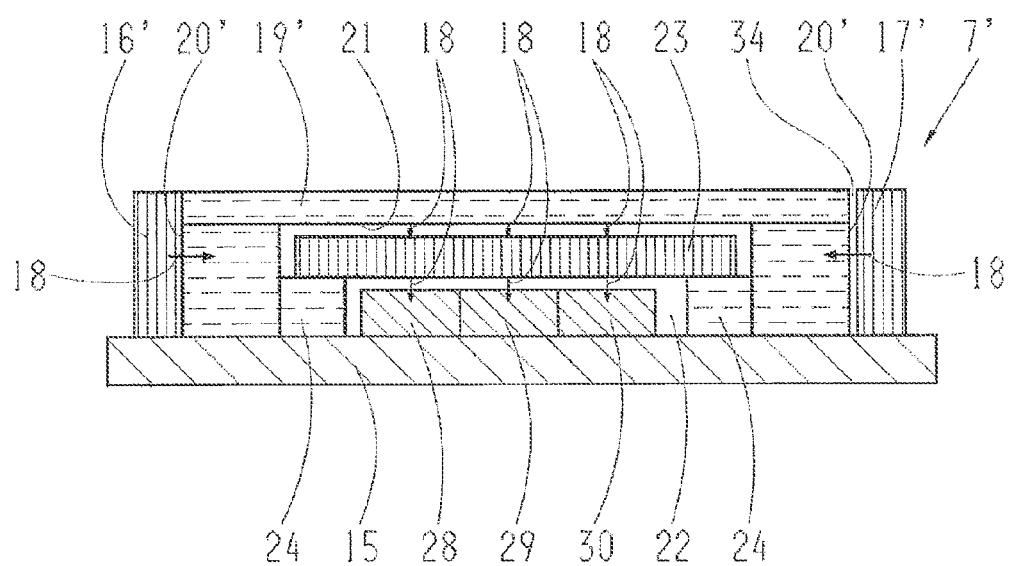
Figure 5:
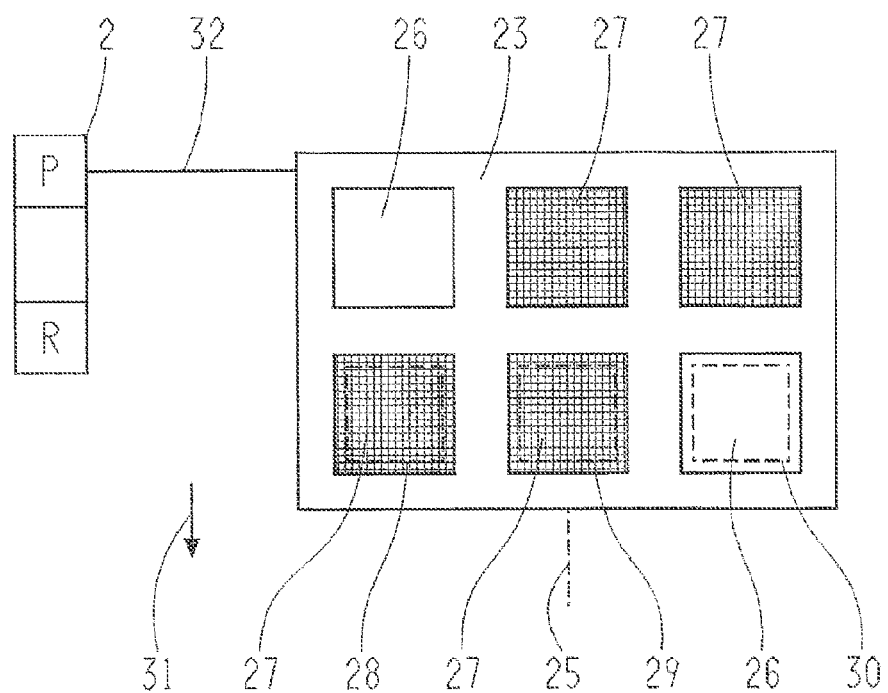

FIG. 4 a schematic sectional view of a detection device for the selector lever position according to a further embodiment, and FIG. 5 a schematic top view onto the coding plate in the selector lever position P.

FIG. 1 depicts a selector lever arrangement 1 according to an embodiment, whereby one selector lever 2 and a shifting axis 3 are swivel mounted to a mounting fixture 4, which is solidly built into a motor vehicle 5, which comprises a motor vehicle transmission 6. Selector lever 2 can be pivoted around shifting axis 3 into predetermined selector lever positions P, R, N and D. A detection device of the selector lever position 7 is intended at mounting fixture 4, by means of which the current selector lever position of the selector lever 2 can be detected. The detection device of the selector lever position 7 includes a sensor arrangement 8 and is electrically connected to evaluation device 9, which in turn is electrically connected to the control unit of the transmission 10 of transmission 6. Furthermore, a latching device is intended, which includes a predefined latching path 11 that is arranged onto mounting fixture 4 and a latch pin 12 which is attached to selector lever 2, which is pushed against latching path 11 by means of a latch pin spring 13. A selector lever knob 14 is intended for the free end of selector lever 2, which can be gripped for the manual operation of selector lever 2.

Transmission 6 is an automatic transmission, so that a parking position is assigned to selector lever position P, in which at least one brake of motor vehicle 5 is activated. A reverse gear of transmission 6 is assigned to selector lever position R, and a neutral gear of transmission 6 is assigned to selector lever position N. Selector lever position D is intended for a normal forward driving of the motor vehicle, so that several forward gears of transmission 6 are assigned to selector lever position D.

FIG. 2 depicts a sectional view of the detection device of the selector lever position 7, whereby sensor arrangement 8 includes several optical sensors 28, 29 and 30, which are arranged on a conductor board 15. Further, two light emitting diodes 16 and 17 are arranged on conductor board 15, which feed light 18 into a light guiding element 19, which is attached to conductor board 15. The light 18 is fed into light guiding element 19 through light input area 20, is deflected inside of it via the chamfered or beveled corner area 33 and is emitted out of light guiding element 19 through light output area 21. Light guiding element 19 includes an inner space 22, which is open towards conductor board 15 and is covered by it. Light output area 21 is further formed by a surface of light guiding element 19, which is limiting the inner space 22 and which is located opposite of conductor board 15, so that sensors 28, 29 and 30, which are allocated inside the inner space 22, are also situated opposite of light output area 21. In an alternative, not depicted embodiment, sensors 28, 29, 30 are allocated below conductor board 15, in other words on a side of light guiding element 19 that is facing away from conductor board 15. Hereby, conductor board 15 has to be designed in a translucent way, at least within the area where sensors 28, 29, 30 are allocated.

The light 18 that is fed into light guiding element 19, is emitted through light output area 21 in the direction of sensors 28, 29 and 30 into the inner space 22. Further, a coding plate 23 is arranged inside the inner space 22, between light output area 21 and sensors 28, 29 and 30, which is attached to light guiding element 19 in a way that it can be moved, for which bearing locations 24 are arranged.

FIG. 3 depicts a sectional view of the detection device of the selector lever position 7 along the intersecting line B-B, as it can be seen in FIG. 2, whereby the position of coding plate 23 is depicted in a schematic way by means of a dashed contour. Coding plate 23, which is mechanically connected to selector lever 2 can be moved by means of pivoting selector lever 2 around shifting axis 3 along the straight line 25. According to this embodiment, coding plate 23 in particular includes one single translational degree of freedom.

FIG. 4 depicts a schematic sectional view of a detection device for the selector lever position 7' according to a further preferred embodiment. The same reference signs apply to elements with the same function, whereby reference signs with an apostrophe denote elements that have been modified accordingly. The detection device for the selector lever position 7' can only be distinguished from detection device for the selector lever position 7 which was depicted in FIGS. 2 and 3 by means of the arrangement of light emitting diodes 16', 17' and by the shape of light guiding element 19'. Individually, light emitting diodes 16', 17' are arranged on the sides of light guiding element 19' and extend over the entire light input area 20'. The left light emitting diode 16', which is depicted in FIG. 4 is situated directly adjacent to the corresponding light input area 20', while the other light emitting diode 17' is arranged on the opposite side of it, with an intermediate gap 34 towards the corresponding light input area 20'. This depiction is exemplary for the possible arrangements concerning the preferred embodiments of the light emitting diodes 20, 20'. As it is depicted in FIG. 2, both light emitting diodes 20' can alternatively be arranged directly adjacent to the respectively assigned light input area 20' or, as a further alternative, they can be arranged to the respectively assigned light input area 20' at a distance, with an intermediate gap 34. It is further not mandatory, that the respective light emitting diodes 20' extend fully over the respective entire side of light guiding element 19'. The size of the light emitting diodes 20' can be appropriately adapted to the necessary light intensity for the detection of the position of selector lever 2, which is connected to coding plate 23. Thus, e.g. one or up to every light emitting diode 20' can be specified to be smaller than the corresponding area of light guiding element 19', which includes at least one light input area 20, 20'.

With the preferred embodiment, as it is depicted in FIG. 4, it is possible to present a compact detection device for the selector lever position 7' in a configuration direction from the conductor board 15 via sensors 28, 29, 30 and coding plate 23 to the light guiding element 19'.

FIG. 5 depicts a schematic top view onto coding plate 23, which includes several translucent areas 26 and several lightproof areas 27. According to FIG. 3, selector lever 2 is set in selector lever position P, whereby sensors 28 and 29 are both covered by one of the lightproof areas 27 and thus, cannot receive any light. Sensor 30 on the other hand does receive light through one of the translucent areas 26. If the non-illuminated status signal of a sensor is described with "0" and the illuminated status signal of a sensor with '1', then sensors 28, 29 and 30 can be assigned the status signal {001} in this sequence. If selector lever 2 is transferred from selector lever position P in the direction of arrow 31 into selector lever position R, it carries along coding plate 23, since this is connected to selector lever 2 by means of a mechanical coupling element 32. In selector lever position R, sensors 28, 29 and 30 are assigned the status signal {100} in this sequence. Areas 26 and 27 thus form an optical coding of coding plate 23, whereby the hamming distance between the two selector lever positions P and R is equal to two. With a hamming distance of two, it can be clearly identified, if exactly one of the sensors failed. Yet, the preferred hamming distance is four or at least four, so that a failure of two sensors can be detected as well. It is further possible to correct an error, if only one of the sensors fails. There is also a possibility to verify with one or more sensors if the light source, which here includes the light emitting diodes 16 and 17, is switched off. In such a case, the one or all of the sensors have to transfer to the state signal "0", which has covered one of the translucent areas 26. The described function of the detection device for the selector lever position 7 as it is depicted in FIG. 3 corresponds to the further preferred detection device for the selector lever position 7' as it is depicted in FIG. 4.

A verification of the function of at least one of the sensors 28, 29, 30 can also be accomplished by means of a clocked activation of light emitting diodes 16, 17. The assigned sensors 28, 29, 30 respectively are hereby set to the respective status signal of one of the clocked light emitting diodes 16, 17. Furthermore, it can be determined if sensors 28, 29, 30 are activated or deactivated by means of establishing the difference of different status signals. By means of establishing the difference, the proportion of a dark current of sensors 28, 29, 30 can be taken into account. A dark current usually appears in elements, which use an inner photoelectric effect. By means of establishing the difference, it is possible to accomplish a further electrical detection in dependence of the status signal of the light emitting diodes.

REFERENCE SIGNS 1 selector lever arrangement
2 selector lever
3 shifting axis
4 mounting fixture
5 motor vehicle
6 motor vehicle transmission
7, 7' detection device for the selector lever position
8 sensor arrangement
9 evaluation device
10 control unit of the transmission
11 latching path
12 latch pin
13 spring
14 selector lever knob
15 conductor board
16,16' light emitting diode
17, 17' light emitting diode
18 light
19, 19' light guiding element
20, 20' light input area of the light guiding element 21 light output area of the light guiding element
22 inner space of the light guiding element
23 coding plate
24 bearing location
25 straight line
26 translucent area
27 lightproof area
28 optical sensor
29 optical sensor
30 optical sensor
31 arrow
32 coupling element
33 corner area
34 gap

The invention claimed is:

1. A selector lever arrangement for operating a transmission in a motor vehicle, the selector lever arrangement comprising:
   a mounting fixture,
   a selector lever mounted on the mounting fixture, wherein the selector lever is movable among a plurality of selector lever positions,
   an optical detection device configured to detect each of the plurality of selected lever positions, the optical detection device comprising:
      a carrier;
      a plurality of optical sensors positioned on the carrier,
      an optical deflector positioned on the carrier and capable of guiding light along an optical path and towards the plurality of optical sensors,
      a self-luminous light source positioned on the carrier so that the optical deflector guides light emitted from the self-luminous light source along the optical path and towards the plurality of optical sensors; and
      a coding element within the optical path, wherein the coding element comprises a plurality of coding positions, wherein each of the plurality of coding positions corresponds to one of the plurality of selected lever positions;
      wherein the optical deflector comprises an interior space that is open towards the carrier and is covered by the carrier; and
      wherein the coding element and the sensors are arranged in the interior space.

2. The selector lever arrangement according to claim 1, wherein the optical deflector comprises:
   a light output area, and
   a light input area,
   wherein when the self-luminous light source emits light, the optical deflector receives the light from the light input area, deflects the light, and emits the light through the light output area towards the coding element, wherein the coding element is positioned between the light output area and the sensors.

3. The selector lever arrangement according to claim 1, wherein the coding element is movable between each of the plurality of coding positions, and wherein the coding element moves along a straight line with respect to the plurality of optical sensors.

4. The selector lever arrangement according to claim 1, wherein the coding element comprises one or two translational degrees of freedom.

5. The selector lever arrangement according to claim 1, wherein the coding element is movably mounted to the optical deflector.

6. The selector lever arrangement according to claim 1, wherein the coding element comprises an optical coding, the optical coding comprises a translucent area and a lightproof area, so that in each one of the plurality of coding positions each of the plurality of optical sensors is covered by a translucent area or a lightproof area.

7. The selector lever arrangement according to claim 6, wherein the optical coding corresponding to one of the plurality of coding positions is spaced adjacently apart from the optical coding corresponding to another one of the plurality of coding positions by a hamming distance of at least four.

8. The selector lever arrangement according to claim 1, wherein the selector lever is connected to the coding element, and
   the mounting fixture is connected to the carrier.

9. The selector lever arrangement according to claim 1, wherein the plurality of optical sensors is electrically connected to an evaluation device configured to control a transmission of a motor vehicle.

10. The selector lever arrangement according to claim 1, wherein the self-luminous light source is controlled under a clock cycle.

11. A selector lever arrangement for operating a transmission in a motor vehicle, comprising:
   a selector lever mounted on a fixture and pivotably movable among a plurality of designated selector lever positions;
   a carrier;
   an optical sensor array on the carrier, comprising a plurality of optical sensors;
   a lighting element on the carrier, comprising a light output area facing towards the optical sensor array; and
   a coding plate between the light output area and the plurality of optical sensors, the coding plate being movable between a plurality of designated coding positions corresponding with the plurality of designated selector lever positions;
   wherein the lighting element comprises an interior space that is open towards the carrier and is covered by the carrier; and
   wherein the coding plate and the plurality of optical sensors are arranged in the interior space.

12. The selector lever arrangement according to claim 11, wherein the lighting element comprises:
   a light source; and
   a light guiding element, comprising:
      a light input area connected to the light source, and
      an optical path between the light input area and light output area.

13. The selector lever arrangement according to claim 12, wherein when the light source emits light, the light guiding element receives the light through the light input area, guides the light along the light path, and emits the light from the light output area to the optical sensor array through the coding element.

14. The selector lever arrangement according to claim 13, wherein the coding plate comprises a pattern thereon comprising one or more translucent areas and one or more lightproof areas, so that in each designated coding position each of the plurality of optical sensors is covered either by a translucent area or a lightproof area.

15. The selector lever arrangement according to claim 14, wherein the pattern corresponding with each designated coding position is configured to identify the corresponding designated coding position.

16. The selector lever arrangement according to claim 15, wherein the pattern comprises a first pattern corresponding to one of the designated coding positions and a second pattern corresponding to another of the designated coding positions, and wherein the first pattern is separated from the second pattern by a hamming distance of at least four.

17. The selector lever arrangement according to claim 11, wherein the selector lever is connected to the coding element, and the mounting fixture is connected to the carrier.

18. The selector lever arrangement according to claim 11, wherein the plurality of optical sensors is electrically connected to an evaluation device configured to control a transmission of a motor vehicle.

19. The selector lever arrangement according to claim 11, wherein the light source emits the light based on a clock cycle.

* * * * *